United States Patent
Dean et al.

(10) Patent No.: US 6,520,836 B2
(45) Date of Patent: Feb. 18, 2003

(54) METHOD OF FORMING A TRAILING EDGE CUTBACK FOR A TURBINE BUCKET

(75) Inventors: Gilbert Joseph Dean, Fountain Inn, SC (US); David Williams, Greenville, SC (US); Kenneth Lorenzo Parks, Simpsonville, SC (US); Rachel Elizabeth Kyano, Greenville, SC (US); Benjamin Erick Baker, Pelzer, SC (US); Hui Kuang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/794,404

(22) Filed: Feb. 28, 2001

(65) Prior Publication Data

US 2002/0119730 A1 Aug. 29, 2002

(51) Int. Cl.$^7$ ................................................. B24B 1/00
(52) U.S. Cl. ..................... 451/28; 29/889.7; 29/889.72; 29/557
(58) Field of Search ........................... 451/28; 29/889.7, 29/889.72, 557

(56) References Cited

U.S. PATENT DOCUMENTS

| 5,062,205 A | * | 11/1991 | Fraser | 228/119 |
|---|---|---|---|---|
| 5,142,778 A | * | 9/1992 | Smolinski et al. | 219/121.66 |
| 5,183,390 A | * | 2/1993 | Amos | 228/114.5 |
| 5,479,704 A | * | 1/1996 | Richter et al. | 228/119 |
| 5,606,796 A | * | 3/1997 | Fraser | 228/119 |
| 5,813,118 A | * | 9/1998 | Roedl et al. | 29/889.1 |
| 6,339,878 B1 | * | 1/2002 | Owen et al. | 29/889.1 |
| 6,339,879 B1 | * | 1/2002 | Wheat et al. | 29/889.7 |
| 6,341,936 B1 | * | 1/2002 | Cowie et al. | 29/889.1 |

* cited by examiner

Primary Examiner—Joseph J. Hail, III
Assistant Examiner—David Nguyen
(74) Attorney, Agent, or Firm—Nixon & Vanderhye

(57) ABSTRACT

The trailing edge of a turbine bucket is cut back from a root portion of the bucket to a location 50–75% of the span of the bucket. The cutback portion is tapered, forming an obtuse angle between it and the remaining original portion of the trailing edge outwardly of the cutback portion. A new conical section is thus created of a slightly larger conical and, hence, transverse configuration. The crack is removed upon removal of the material forming the cutback. With the edges of the recreated conical section surrounded, the cutback portion assumes a scalloped configuration with the exit openings of the cooling holes as seen from opposite sides of the bucket.

9 Claims, 4 Drawing Sheets

METHOD OF FORMING A TRAILING EDGE CUTBACK FOR A TURBINE BUCKET

BACKGROUND OF THE INVENTION

The present invention relates to a method of forming a trailing edge cutback for one or more buckets of a turbine and particularly relates to a method of removing and refurbishing a cracked region of the turbine bucket after use to form a cutback.

Gas turbine buckets have stringent requirements for their design and manufacture. The airfoil contour of the bucket is a significant consideration in the operation of the turbine as well as during turbine repair or refurbishment, e.g., at periodic service intervals. At those service intervals, the buckets are inspected for cracking. Gas turbine buckets, particularly those constructed of a nickel-based superalloy, are sometimes prone to cracking under certain operating conditions. That is, crack initiation and propagation rates in a gas turbine bucket are typically determined by the operating conditions in which the bucket is placed.

More particularly, gas turbine buckets are conventionally cooled by flowing a cooling medium, typically air, through the buckets and which cooling air exits from the bucket through a plurality of holes spaced one from the other usually along the trailing edge of the bucket. The holes at their forward ends internally of the bucket communicate with generally radial passages carrying the cooling medium within the bucket. Generally, any involved cracking of the bucket occurs in the cooling hole nearest the root portion of the bucket along the trailing edge thereof. For example, a crack may be initiated along the trailing edge airfoil in the first cooling hole outboard from the root and directly adjacent the exit opening of the cooling hole. The crack may propagate inwardly of the bucket along the hole and across the airfoil. That is, the crack propagates at the exit hole and works its way inwardly along the hole.

In the event a crack occurs and is identified, it is essential that the bucket be repaired or refurbished before being placed back in service. Coatings are normally applied to the turbine buckets undergoing repair and coatings will often fill the crack. Thus, the crack, if left in the turbine bucket, would continue to propagate and, in most cases, could not be identified again during operation of the machine using a boroscope inasmuch as the boroscope can inspect only the external surfaces of the buckets. That is, the buckets cannot be effectively refurbished without removing or repairing the crack because, once the bucket is recoated, the crack cannot be effectively monitored for propagation. It is also significant that the airfoil configuration of the buckets be maintained to the extent possible during the refurbishing process and that airfoil-to-airfoil variation in the buckets subject to repair must be minimized to maintain long-term reliability of machine operation. It will be appreciated that generally the cracks develop along the first or second cooling hole nearest the root portion of the trailing edge of the bucket.

BRIEF SUMMARY OF THE INVENTION

In accordance with a preferred embodiment of the present invention, the buckets in a turbine wheel in which cracks occur are identified and repaired, minimizing airfoil-to-airfoil variation among the repaired and non-repaired buckets wherein the repaired airfoils are refurbished only along the trailing edge from a root portion to approximately 50–75% of the span of the bucket. The repair process involves the removal of the crack at the trailing edge cooling hole nearest the root portion by machining away airfoil material around the hole and crack and creating a new airfoil geometry for the bucket at that location. The geometry gives the airfoil a trailing edge cutback from the root portion of the airfoil of the bucket to midspan. The resulting airfoil geometry minimizes the impact on unit performance caused by the removal of the material, while maintaining design requirements for thermal and mechanical stress, low-cycle fatigue and total system natural frequency.

More particularly, it will be appreciated that the trailing edge of the unrepaired turbine bucket is rounded and has a conical configuration as viewed along the length of the trailing edge. By removing trailing edge material from adjacent the midspan to the root portion and in a tapered manner, a slightly larger and new conical section is recreated along the refurbished portion of the trailing edge. To remove the material, and in one embodiment of the present invention, a planar cut is machined along the trailing edge from an intermediate span portion to the root portion, forming a planar surface along that trailing edge portion which removes the crack or cracks propagated along the cooling hole or holes nearest the root portion of the bucket. This resulting planar surface has sharp edges with the suction and pressure sides of the airfoil. Those edges are then rounded or radiussed using hand grinders and radius gauges to provide the appropriate radii at predetermined locations along the bucket span from the root portion. The resulting trailing edge is thus cut back and the cooling holes form a scalloped appearance as viewed from the sides of the bucket. It has been found that this variation in the airfoil is quite minimal upon comparison with the airfoil of an unrefurbished bucket. Consequently, it is not necessary to refurbish all buckets of a turbine wheel during repair intervals, but only those which manifest cracks. In another embodiment, a five-axis numerically controlled milling machine may be used to form the enlarged refurbished conically tapered section of the trailing edge in a single operation with the radii along pressure and suction sides being precalculated and formed at various span locations.

In a preferred embodiment according to the present invention, there is provided a method of repairing a bucket of a turbine having a crack formed along the trailing edge of the bucket adjacent a root portion of the bucket, comprising the step of machining the trailing edge of the bucket between the root portion and an intermediate span location up to about 75% of the bucket length from the root portion to form a trailing edge cutback having a conical section therealong.

DETAILED DESCRIPTION OF THE INVENTION

Figure 1:
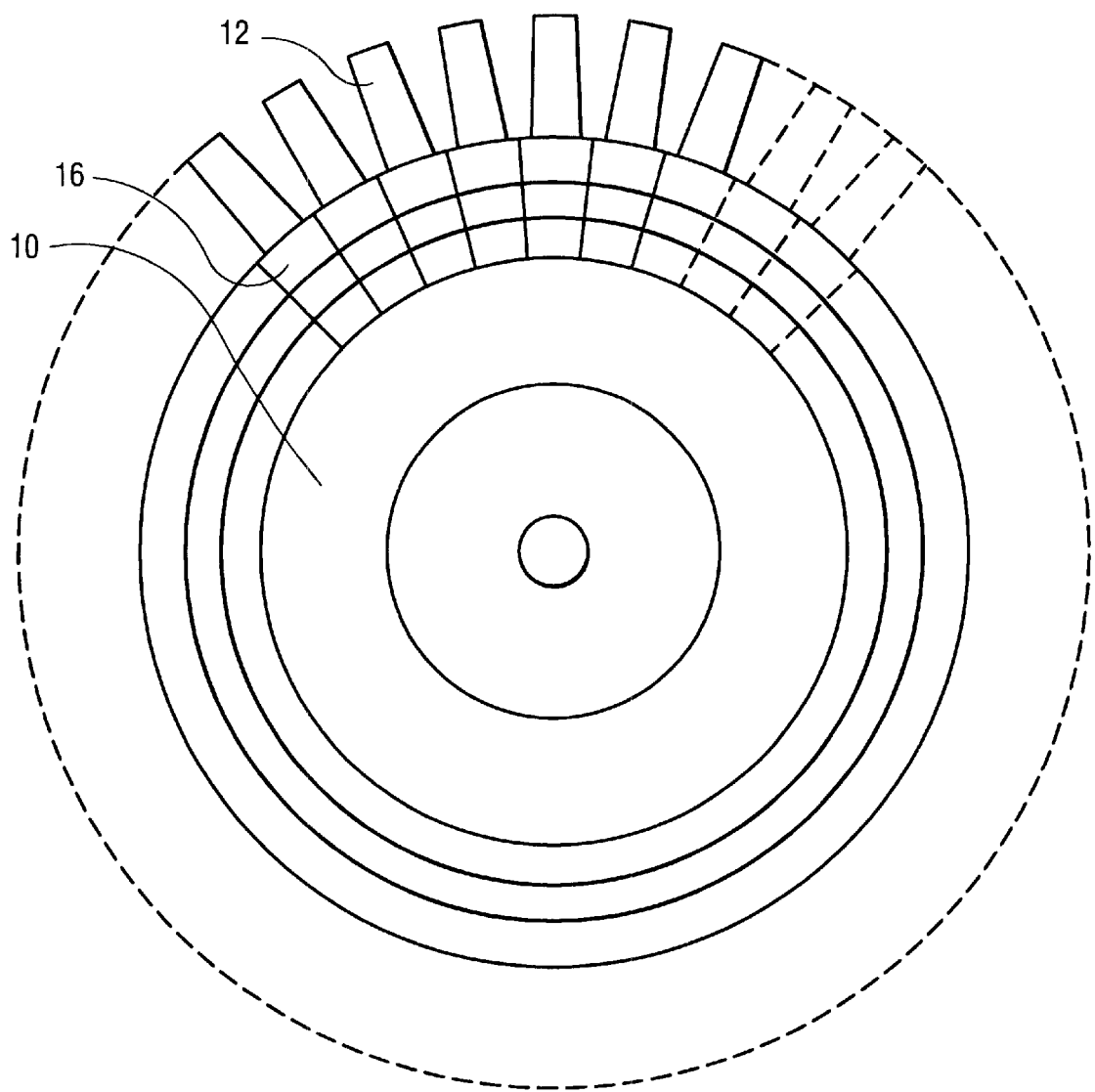
FIG. 1 is a schematic axial elevational view of a turbine wheel mounting buckets.
Figure 2:
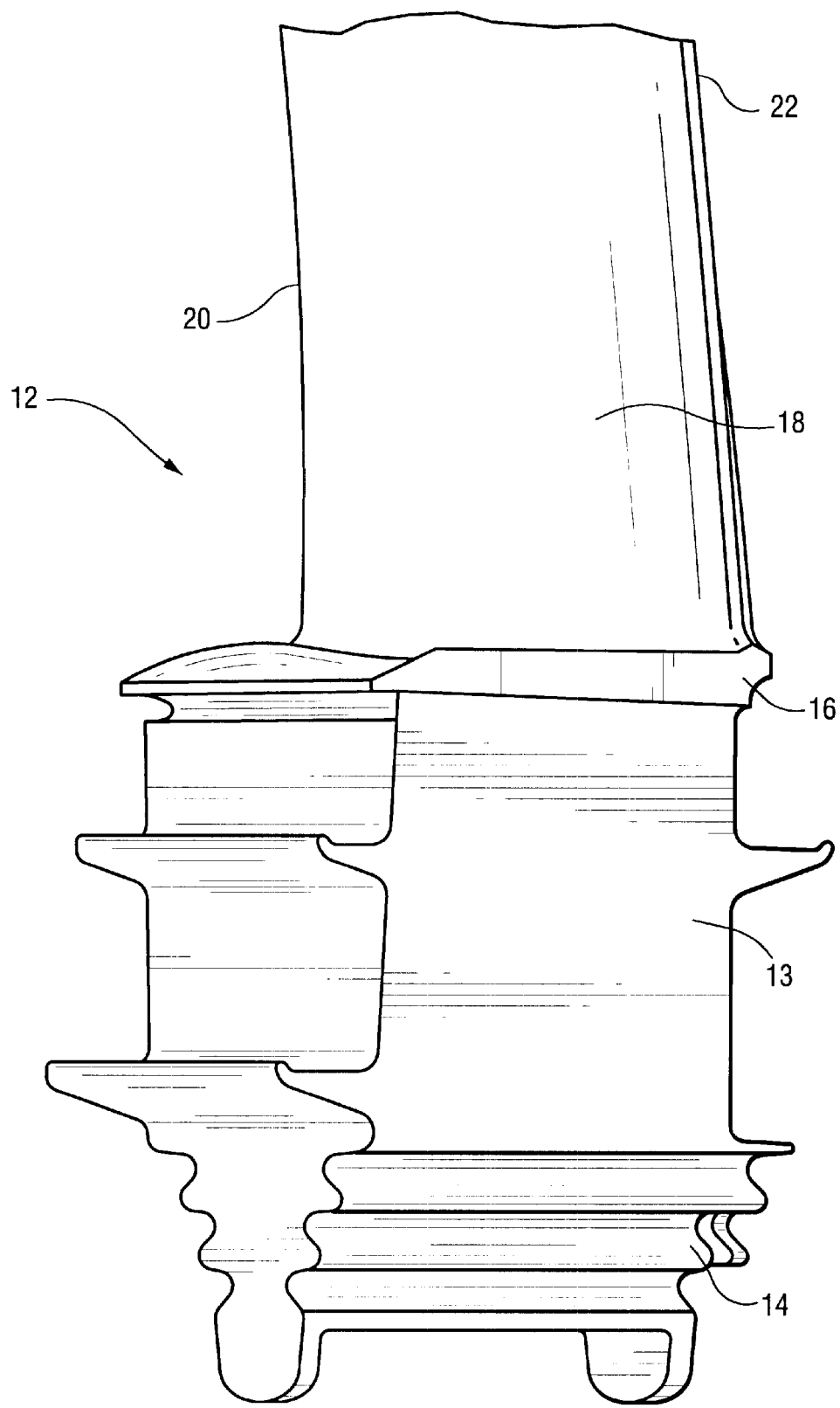
FIG. 2 is an enlarged, generally axial view of a turbine bucket.

Referring now to the drawings, particularly to FIG. 1, there is illustrated a turbine wheel 10 having a plurality of buckets 12 spaced circumferentially about the wheel and forming part of a turbine rotor. It will be appreciated, and with reference to FIG. 2, that the buckets 12 typically comprise a shank portion 13 having a dovetail 14 for coupling the bucket to a corresponding dovetail in the wheel 10. The root portion 16 of the bucket 12 mounts the airfoil-shaped body 18 of the bucket, it being appreciated that the bucket 12 is typically formed as an integral casting. As illustrated in FIG. 2, the airfoil body 18 has a leading edge 20 and a trailing edge 22. While not illustrated, the buckets are provided with generally radially extending passages for conducting a cooling medium along the length of the bucket from the shank portion 13 to the tip portion of the bucket where the cooling medium, e.g., compressor discharge air, exits into the hot gas path.

Figure 3:
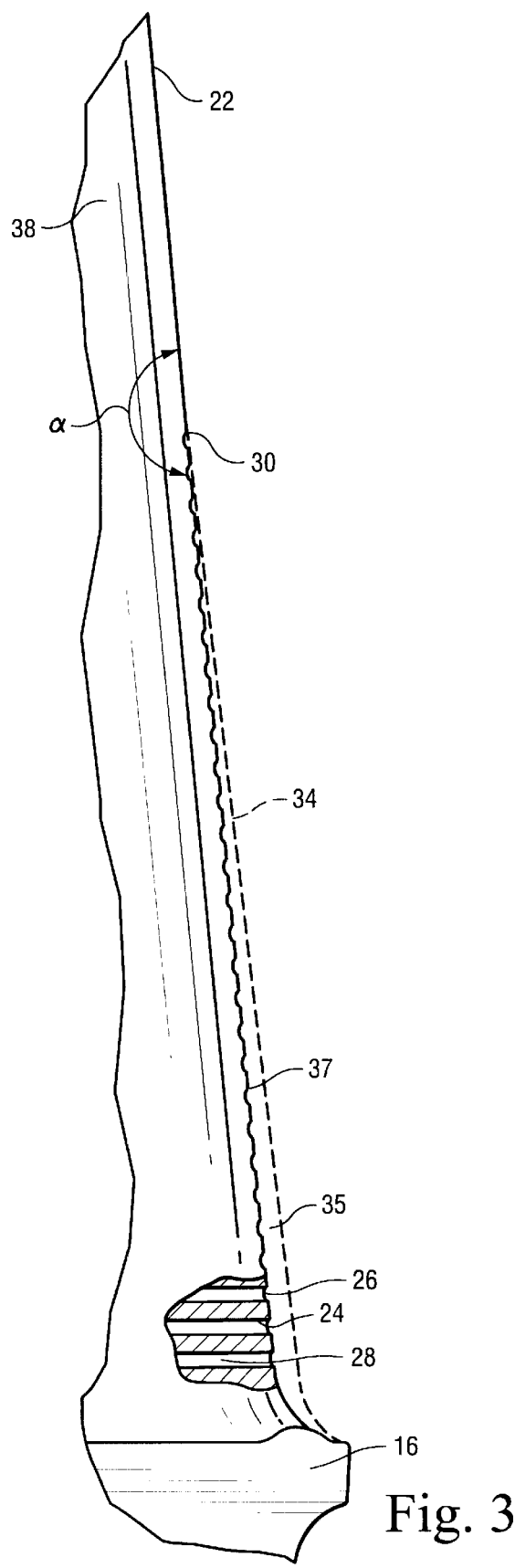
FIG. 3 is an enlarged fragmentary view, with portions broken out and in cross-section, of a bucket trailing edge subject to repair.

Referring now to FIG. 3, it is conventional to provide a plurality of cooling holes 24 communicating at their inner ends with one of the radially extending passages for flowing cooling air from the passage along the trailing edge portion of the bucket and which cooling air exits the trailing edge at outlet openings 26. Generally, the cooling holes 24 are spaced one from the other along the length of the bucket and are generally circular or elliptical in cross-sectional configuration. As noted above, cracks often develop after usage and propagate along the airfoil along paths of least resistance. Typically, the cracks develop in the first cooling passage 28 adjacent the root portion 16. The cracks develop near the exit opening 26 along the inside of the passage 28 and propagate generally inwardly from the trailing edge along the passage in a direction toward the leading edge. Once the crack is observed upon inspection during an out-of-service interval, the crack must be repaired, as otherwise it would continue to propagate.

To effect the repair, and without causing additional stress regions in the trailing edge of the bucket as a result of such repair, a portion of the trailing edge is cut back to remove material and, hence, remove material surrounding the crack, leaving an area of the trailing edge adjacent the previously formed crack free of any crack formation. To accomplish this, while retaining minimum airfoil-to-airfoil variation among repaired and unrepaired buckets on the same turbine wheel, material is removed from the trailing edge between the root portion 16 and adjacent a midspan portion 30 of the trailing edge. That is, approximately 50–75% of the length of the airfoil section of the bucket outwardly from the root portion 16 is removed. It will be appreciated that the trailing edge of the bucket prior to repair has a rounded edge and forms a conical section, with the larger portion of the conical section adjacent the root portion 16. When the material is removed, a new trailing edge conical section is recreated which is slightly larger than the conical section of the unrepaired trailing edge.

Figure 4:
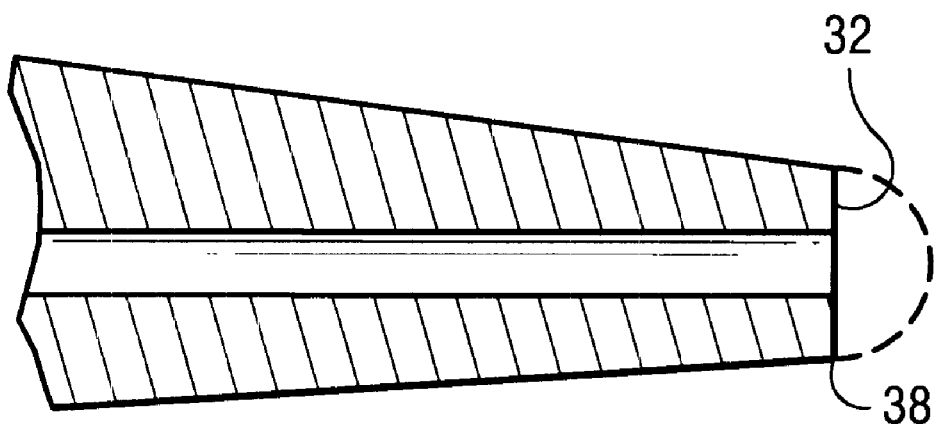
FIGS. 4 and 5 are cross-sectional views of the trailing edge adjacent the root portion illustrating intermediate and final configurations thereof during a repair process.
Figure 5:
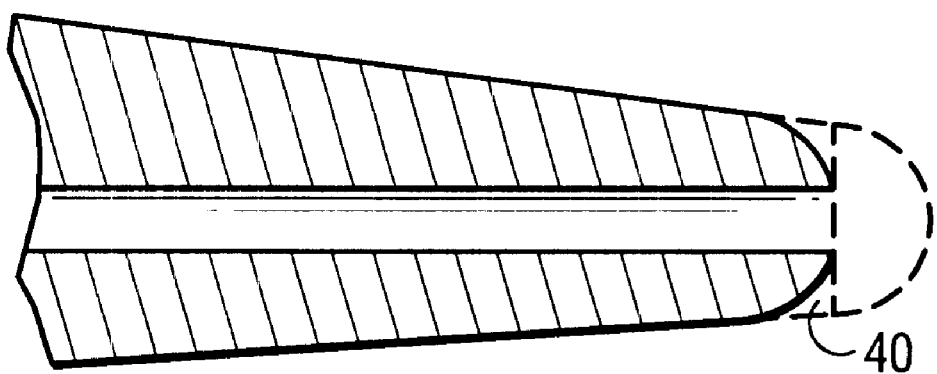

In one form of the present invention, and referring to FIGS. 4 and 5, a machining operation is performed along the trailing edge to initially form a flat, planar surface 32, as illustrated in FIG. 4. The material 35 removed to form the cutback 37 is identified by the area of the trailing edge between the dashed line 34 representing, in FIG. 3, the unrepaired or original trailing edge, and the flat planar surface 32 of the trailing edge cutback after removal of the material therebetween as well as the radii 40 discussed below. It will be appreciated that a milling machine may be used to grind the trailing edge from the midspan portion 30 to the root portion 16 to form a planar surface 32 along the trailing edge cutback. The new flat planar surface 32 identifies the aft extent of the repaired or refurbished bucket and forms an obtuse angle α between the unrepaired outer span portion 38 and the repaired portion. The resulting surface constitutes the recreated trailing edge cutback 37.

From a review of FIG. 4, it will be appreciated that sharp edges 38 are formed between the planar surface 32 and the suction and pressure sides of the airfoil. Radii 40, as illustrated in FIG. 5, are formed between the planar edge 32 and the opposite sides of the airfoil along the cutback. This is accomplished by grinding the airfoil edges to the appropriate radii at various locations along the span of the trailing edge from a datum line. The radii and cutback surfaces are calculated to provide a close approximation of the original airfoil shape to maintain minimal variation between original non-repaired and repaired airfoils. Radius gauges are employed at the various span locations from the datum to ensure accurate radii formation.

It will be appreciated that as the radii are formed, the cutback 37 of the trailing edge affords a scalloped configuration as illustrated in FIG. 3 as viewed from opposite sides of the airfoil. The scalloped configuration is a result of the cooling holes 24 exiting the cutback trailing edge. Also, it will be appreciated that the new conical section recreated in the trailing edge cutback is slightly larger in transverse dimension than the original conical section at locations all along the cutback.

As an alternative to first forming a planar surface and hand-grinding radii along opposite sides of the airfoil, a five-axis CNC milling machine may be used to form the new conical section in a single operation. The machine is thus programmed to the appropriate cutback, as well as the radii at the different span locations along the length of the blade to remove the minimum amount of material necessary to remove the crack.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing a bucket of a turbine having a crack formed along a trailing edge of the bucket adjacent a root portion of the bucket, comprising the steps of:
    forming a trailing edge cutback having a conical section therealong by machining the trailing edge of the bucket between the root portion and an intermediate span location up to about 75% of the bucket length from the root portion to create a new trailing edge including the cutback and a remaining trailing edge portion of the bucket between said intermediate location and a tip of the bucket.

2. A method according to claim 1 wherein the step of machining includes removing material from the trailing edge between said location and the root portion to form a planar surface therealong and thereafter rounding edges of the planar surface on opposite suction and pressure sides of the bucket.

3. A method according to claim 1 wherein the step of machining includes forming the trailing edge cutback at an obtuse angle to the remaining trailing edge portion of the bucket between the intermediate span location and a tip of the bucket.

4. A method according to claim 1 wherein the bucket forms part of a turbine rotor having a plurality of buckets spaced circumferentially thereabout and wherein the step of machining is applied solely to buckets manifesting cracks and not to buckets which do not manifest cracks.

5. A method of repairing a bucket of a turbine having a crack formed along the trailing edge of the bucket adjacent a root portion of the bucket, comprising the step of:

machining the trailing edge of the bucket between the root portion and an intermediate span location up to about 75% of the bucket length from the root portion to form a trailing edge cutback having a conical section therealong; and wherein the step of machining includes removing material from the trailing edge between said location and the root portion to form a planar surface therealong and rounding edges of the planar surface on opposite suction and pressure sides of the bucket and forming the trailing edge cutback at an obtuse angle to a remaining trailing edge portion between said intermediate span location and a tip of the bucket.

6. A method of repairing a bucket of a turbine having a crack formed along the trailing edge of the bucket adjacent a root portion of the bucket, comprising the step of:

machining the trailing edge of the bucket between the root portion and an intermediate span location up to about 75% of the bucket length from the root portion to form a trailing edge cutback having a conical section therealong;

the bucket having a plurality of cooling holes extending generally parallel to one another along the trailing edge and opening through the trailing edge and wherein the step of machining includes forming a scalloped trailing edge cutback as viewed from one side of the bucket.

7. A method according to claim 1 including machining the trailing edge of the bucket between the root portion and the intermediate span location wherein the intermediate span location is about 50–75% of the bucket length from the root portion.

8. A method according to claim 1 including machining the trailing edge of the bucket between the root portion and the intermediate span location wherein the intermediate span location is no greater than about 50% of the bucket length from the root portion.

9. A method according to claim 1 including forming the trailing edge cutback at an obtuse angle to the remaining trailing edge portion.

* * * * *